US010669460B2

United States Patent
Bardts

(10) Patent No.: US 10,669,460 B2
(45) Date of Patent: Jun. 2, 2020

(54) EPOXY-SILICONE HYBRID SEALANT COMPOSITION WITH LOW SHRINKAGE AND LOWER POSTCURING PROPERTIES WITH CHEMICAL RESISTANCE FOR AEROSPACE APPLICATIONS

(71) Applicant: 3M INNOVATIVE PROPERTIES COMPANY, St. Paul, MN (US)

(72) Inventor: Mareike Bardts, Hilden (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/489,404

(22) PCT Filed: Apr. 2, 2018

(86) PCT No.: PCT/US2018/025628
§ 371 (c)(1),
(2) Date: Aug. 28, 2019

(87) PCT Pub. No.: WO2018/187193
PCT Pub. Date: Oct. 11, 2018

(65) Prior Publication Data
US 2020/0017738 A1  Jan. 16, 2020

(30) Foreign Application Priority Data

Apr. 4, 2017 (EP) ..................... 17164844

(51) Int. Cl.
| C09J 5/00 | (2006.01) |
| C09J 183/06 | (2006.01) |
| C08G 59/56 | (2006.01) |
| C08L 63/00 | (2006.01) |

(52) U.S. Cl.
CPC ............... *C09J 183/06* (2013.01); *C09J 5/00* (2013.01); *C09J 2463/00* (2013.01); *C09J 2483/00* (2013.01)

(58) Field of Classification Search
None
See application file for complete search history.

(56) References Cited

U.S. PATENT DOCUMENTS

| 3,549,592 A | 12/1970 | Godfrey |
| 4,055,541 A | 10/1977 | Riew |
| 5,019,608 A | 5/1991 | Shah |
| 5,561,174 A * | 10/1996 | Saito ................... C08G 59/306 257/E23.12 |
| 5,763,540 A | 6/1998 | Nakada |
| 2005/0288427 A1 | 12/2005 | Ahn |
| 2014/0073720 A1 | 3/2014 | Geismann |
| 2014/0179830 A1 | 6/2014 | Burckhardt |
| 2014/0309335 A1 * | 10/2014 | Elgimiabi ............. C08G 59/54 523/400 |

FOREIGN PATENT DOCUMENTS

| CN | 102417805 | 4/2012 |
| CN | 103074022 A | 5/2013 |
| CN | 103880331 A | 6/2014 |
| CN | 103937432 A | 7/2014 |
| EP | 0 838 499 A1 | 4/1998 |
| EP | 2 468 792 A1 | 6/2012 |
| JP | 05255614 | 10/1993 |
| JP | 05271389 A | 10/1993 |
| JP | 2006249232 A | 9/2006 |
| JP | 2013147549 A | 8/2013 |
| JP | 2013181161 A | 9/2013 |
| KR | 2003059053 | 7/2003 |
| WO | WO 1995/012647 | 5/1995 |
| WO | WO 2004/078853 | 9/2004 |
| WO | WO 2005/059000 | 6/2005 |
| WO | WO 2006/044970 | 4/2006 |
| WO | WO 2007/002177 | 1/2007 |
| WO | WO 2009/038960 | 3/2009 |
| WO | WO 2011/031399 | 3/2011 |
| WO | WO 2013/073606 | 5/2013 |
| WO | WO 2014/139212 | 9/2014 |

OTHER PUBLICATIONS

Intl Search Report for PCT/US2018/025628, dated May 29, 2018 (5 pages).

* cited by examiner

*Primary Examiner* — Tae H Yoon
(74) *Attorney, Agent, or Firm* — Philip P. Soo

(57) ABSTRACT

In one aspect of the present disclosure, there is provided a sealant precursor, comprising a first part (A) comprising (a1) an epoxy curing agent having an amine equivalent weight of at least 150 grams per mole of amine equivalents; (b1) a first epoxy curative; a second part (B) comprising (a2) a blend of epoxy resins comprising at least one bisphenol A epoxy resins and at least one bisphenol F epoxy resin; (b2) at least one silicone-based resin comprising epoxy functionalities; (c2) optionally, a toughener.

14 Claims, No Drawings

EPOXY-SILICONE HYBRID SEALANT COMPOSITION WITH LOW SHRINKAGE AND LOWER POSTCURING PROPERTIES WITH CHEMICAL RESISTANCE FOR AEROSPACE APPLICATIONS

CROSS REFERENCE TO RELATED APPLICATIONS

This application is a national stage filing under 35 U.S.C. 371 of PCT/US2018/025628, filed Apr. 2, 2018, which claims the benefit of EP Patent Application No. 17164844.7, filed Apr. 4, 2017, the disclosures of which are incorporated by reference in their entirety herein.

FIELD

The disclosure relates to curable sealant compositions and the sealants obtained therefrom. Furthermore, the present disclosure relates to parts of vehicles comprising a sealant obtained from the curable sealant composition as described herein. The present disclosure further provides a method for sealing parts. Finally, the present disclosure relates to the use of the curable composition or of the sealant obtained therefrom as sealant in a vehicle, in particular in a helicopter, aircraft, automobile or spacecraft.

BACKGROUND

Sealants are used in a wide variety in the manufacture of vehicles. In general, sealants are chemical compounds and are employed to seal gaps between mechanical parts of vehicles. Depending on the use and the vehicle, certain requirements to the sealants have to be met. In particular, in aerospace industry, sealants are used most often, due to the great pressure differences experienced between the interior of an airplane or parts of an airplane and the outer atmosphere, in particular when flying at higher speeds and an altitude. Thus, not only fuel tanks and pipelines, but also doors, windows, interior and other panels, parts of the wings and so on need to be sealed. The requirements of the aerospace industry to the sealants employed are particularly strict. Not only good sealant properties over a long time are desirable, but also a certain resistance towards chemical influence such as fuel or deicing fluids or even hydraulic fluids. Apart from that, it is always desirable that sealant compositions may be easily applied in manufacturing processes and need as few as possible application steps or additional steps such as application of heat for curing.

Presently, sealants employed in aerospace industry are based on polysulfide chemistry. Polysulfide-based sealants exhibit a broad range of properties advantageous for the intended use, such as high flexibility and resistance to deicing fluid. Apparently, due to these properties, there is at the present point no alternative for polysulfide-based sealants available for most aerospace applications. However, there are certain disadvantages reported in conjunction with polysulfide-based sealants, such as high shrinkage (which means that several layers of sealant have to be applied), curing strongly dependent on humidity and temperature (meaning a limited manufacturing cycle), complicate handling of mixing ratios, high density, and strong odour. Moreover, it has been reported that sealants based on polysulfides are not resistant to Hydraulic Fluids used in present-day aircrafts.

Accordingly, there exists a need for alternative materials useful as sealants, in particular for aerospace applications. For example, WO2009/038960 A2 describes somewhat flexible two-part compositions comprising a first part comprising one or more nitrile-butadiene rubber and long chain diamine and a second part comprising an epoxy resin and a silicone resin or a resin comprising epoxy and silicone resins. While these compositions are described to be useful as sealants or coatings for in particular wooden surfaces, it further appears that they do not fulfil the requirements for sealants for aerospace applications.

Without contesting the technical advantages associated with the sealant compositions known in the art for sealants, in particular in the aerospace industry, there is still a strong need for curable sealant composition for use in aerospace applications.

Other advantages of the curable sealant compositions and methods of the present disclosure will be apparent from the following description.

SUMMARY

The present disclosure provides a precursor for a curable sealant composition, the precursor comprising a first part (A) and a second part (B) physically separated from the first part (A),
the first part (A) comprising
  (a1) an epoxy curing agent having an amine equivalent weight of at least 150 grams per mole of amine equivalents;
  (b1) a first epoxy curative;
  (c1) optionally, a second epoxy curative distinct from the first epoxy curative; the second part (B) comprising
  (a2) a blend of epoxy resins comprising at least one bisphenol A epoxy resin and at least one bisphenol F epoxy resin;
  (b2) at least one silicone-based resin comprising epoxy functionalities;
  (c2) optionally, a toughener.

The present disclosure further provides a sealant, obtained by the curable sealant composition.

In this regard, the present disclosure provides a part of a vehicle, comprising at least one sealant as described herein.

In addition, the present disclosure provides a method for sealing a part, comprising
  (i) Mixing parts (A) and (B) of the precursor as described herein, thereby obtaining a curable sealant composition;
  (ii) applying the curable sealant composition onto at least part of the surface of at least one first part;
  (iii) Optionally, placing a second part onto the at least partially coated at least one first part obtained in step (ii) such that the curable sealant composition is in direct contact with both parts;
  (iv) Allowing the curable sealant composition to cure.

Furthermore, the present disclosure relates to the use of the sealant precursor and the curable sealant composition as described herein for sealing parts in a vehicle.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt", or "wt.-%") unless specified otherwise. The amounts of all ingredients gives 100% wt unless specified otherwise. If the amounts of ingredients is identified by % mole the amount of all ingredients gives 100% mole unless specified otherwise.

Unless explicitly stated otherwise, all embodiments and optional features of the present disclosure can be combined freely.

The first aspect of the present disclosure is a precursor of a curable sealant composition, the precursor comprising a first part (A) and a second part (B) physically separated from the first part (A), the first part (A) comprising
(a1) an epoxy curing agent having an amine equivalent weight of at least 150 grams per mole of amine equivalents;
(b1) a first epoxy curative;
(c1) optionally, a second epoxy curative distinct from the first epoxy curative; the second part (B) comprising
(a2) a blend of epoxy resins comprising at least one bisphenol A epoxy resins and at least one bisphenol F epoxy resin;
(b2) at least one silicone-based resin comprising epoxy functionalities;
(c2) optionally, a toughener.

Sealant precursor compositions as those according to the present disclosure are also known as 2-component compositions or 2k-compositions. It is understood that the first part (A) is physically separated from the second part (B) of the curable sealant precursor. The first part (A) and second part (B) are mixed before the intended use according to the user's needs so as to obtain a curable sealant composition. Thus, the present disclosure also covers a curable sealant composition, obtained from the sealant precursor and a sealant obtained from curing the curable sealant composition. The use of these 2k-sealants offers several advantages such as a longer shelf-life, the possibility to form a curable composition according to the user's needs, and a readily curable composition which itself offers further handling advantages for the user, in particular in the technical field of manufacturing of parts for the aerospace industries.

The sealant precursor according to the present invention may exhibit at least one or even a combination of desirable properties such as good handling properties, fast curing times, good sealing properties of the cured sealant such as good tensile strength, tensile elongation, peel strength as well as good aging properties and chemical resistance towards fuel, deicing fluid or water, and may further exhibit overlap shear strength of at least 5 MPa or even at least 10 MPa.

In the context of the present disclosure, the terms "room temperature" and "ambient temperature" are used interchangeably and refer to a temperature of 23° C. (±2° C.) at ambient pressure condition of about 101 kPa.

It has in particular been found that the advantages as described herein may be achieved by the combination of features of the sealant precursor according to claim 1.

Epoxy curing agents suitable for use in the present disclosure are compounds which are capable of cross-linking (curing) epoxy resins and epoxy functionalities in general, such as the silicone-based resin as present in part (B) of the sealant precursor as described herein. Suitable curing agents according to the present invention may be primary or secondary amines. The epoxy curing agent present in part (A) may comprise two epoxy curing agents, a first epoxy curing agent and a second epoxy curing agent which is distinct (i.e. chemically different) from the first epoxy curing agent. First part (A) may also comprise further curatives, in particular two curatives wherein the second curatives is distinct from the first curative.

The epoxy curing agent for use herein has an amine equivalent weight (AEVV) of at least 150 grams per mole of amine equivalents. In that context, the epoxy curing agent for use herein may be any aliphatic, cycloaliphatic, linear, branched or aromatic polyether amine provided it meets the (AEVV) requirement mentioned above. The same is true if a combination of two epoxy curing agents are employed, i.e. the combination of epoxy curing agents needs to have a total amine equivalent weight of at least 150 grams per mole of amine equivalent. The term "amine equivalent weight" has the meaning as common in the art. As commonly known, the amine equivalent weight may easily be determined by titration. For example, the amine may be titrated with 0.1 N aqueous hydrochloric acid. The amine equivalent weight is the weight of the sample divided by the equivalents of hydrochloric acid used for titration.

Without wishing to be bound by theory, it is believed that the epoxy curing agent having an amine equivalent weight of at least 150 grams per mole of amine equivalents provides fast curing properties to the curable sealant due its inherent high reactivity, while further providing excellent chemical resistance after curing with the epoxy resin.

In a particular aspect, the epoxy curing agent is a polyether amine having one or two or more primary amine moieties. The polyether amine may have from 1 to 12, or even from 1 to 6 catenary ether (oxygen) atoms.

In a preferred aspect, the epoxy curing agent comprises at least one polyether amine derived from polypropylene oxide or polyethylene oxide. Exemplary polyether amines suitable for use herein are commercially available under the trade designation JEFFAMINE from Huntsman Chemicals, or 4,7,10-trioxatridecane-1,13-diamine) commercially available, for example, from BASF, Ludwigshafen Germany. In a further preferred aspect, an adduct of the at least one polyether amine derived from polypropylene oxide or polyethylene oxide with an epoxide resin is used as a first epoxy curing agent. For example, an adduct of TTD with a commercially available epoxy resin such as Epon 828 may be advantageously used, as long as the adduct has an amine equivalent weight of at least 150 grams per mole of amine equivalents. The adduct of TTD with said epoxy resin may be readily prepared by procedures well-known to the skilled person, e.g. by mixing TTD and epoxy resin and keeping the mixture for about one hour at elevated temperatures such as about 100° C.

In a further preferred embodiment, the epoxy curing agent comprises a polyamidoamine. The polyamidoamine may be branched or unbranched aromatic or branched or unbranched aliphatic. Preferably, the polyamidoamine is a polyether amido-amine, more preferably an aliphatic polyether amido-amine. Suitable examples include the reaction products of TTD and a fatty acid, as long as this adduct has an amine equivalent weight of at least 150 grams per mole of amine equivalents.

Accordingly, the epoxy curing agent may either comprise at least one adduct of TTD with an epoxy resin and/or at least one polyamidoamine, or any combinations thereof. Polyamidoamines such as polyether amidoamines, in particular aliphatic polyether polyamidoamines are particularly preferred in the context of the present disclosure.

It is preferred that the epoxy curing agent is contained in an amount in the range of from 50 to 97 wt.-%, preferably in the range of from 55 to 95 wt.-%, more preferably in the range of from 60 to 93 wt.-%, based on the total weight of part (A).

According to an advantageous aspect of the present disclosure, part (A) of the sealant precursor comprises at least one epoxy curative. Epoxy curatives are not epoxy curing agents, i.e. they are not necessarily incorporated into the crosslinked network of the epoxy resins. Rather, they may accelerate the crosslinking reactions and may therefore also be called in the art secondary epoxy curatives, curing aids or curing accelerators. In this regard, it is preferred that part (A) comprises at least one first epoxy curative and at least one second epoxy curative distinct from the first curative. Distinct in this regard means "chemically distinct", i.e. being a different compound. Using such a combination of first and second epoxy curative as described herein has the effect of reducing the curing time of the curable sealant composition obtained from combining part (A) and part (B) of the sealant precursor according to the present disclosure. That is, for many applications, in particular in aerospace industry where during manufacture of an aeroplane or parts of aeroplanes great numbers of sealants are applied, short curing times are at least desirable, if not required. Moreover, curing takes place in these applications under ambient conditions, i.e. without addition of heat. When using the combination of first and second curative as described herein, curing times of lower than 4 h, lower than 3 h or even lower than 2 h when curing at ambient conditions may be observed for curable sealant compositions as described herein. The term "curing time" as used herein may be interchangeably used with the term "tack-free time" used in the art for the period of time in which the sealant obtained as described herein remains tacky and is not yet fully serviceable.

It is further preferred that the at least one first epoxy curative as described herein is a metal salt. This may have the effect of an increased curing speed, which is very advantageous in many applications, e.g. in sealing connecting parts in the aerospace or automotive manufacturing industry. Accordingly, curing at ambient temperature, together with good mechanical strength of the bond obtained may be achieved.

Preferably, the metal in the metal salt catalyst is selected from the group consisting of alkali, earth alkali, rare earth metals, aluminium, preferably from alkali and earth alkali, more preferably from alkaline earth, even more preferably from calcium, caesium, strontium, and magnesium. The anion is preferably selected from nitrate, nitrite and organic acid anion, preferably sulfates and triflates, more preferably triflates, of which nitrates and triflates are particularly preferred. Nitrates are strongly preferred. It was found that the combination of the second epoxy curative and the first epoxy curative, in particular the metal salt, gives rise to an increase in curing speed. In this regard, metal salt catalyst selected from the group consisting of calcium nitrate, calcium triflate, aluminium nitrate, magnesium nitrate, lithium nitrate, potassium nitrate, sodium nitrate, and any combinations thereof is preferred. The use of calcium nitrate, magnesium nitrate, calcium triflate, and any combinations thereof is preferred, with particular preference on calcium nitrate. Without wanting to being bound to theory, it is believed that the metal salt thickens the material and therefore influences the viscosity of the part (A) of said sealant precursor in a positive way. For example, it is highly advantageous and therefore preferred that the second epoxy curative is tris-(dimethylaminomethyl) phenol and the first epoxy curative is calcium nitrate, magnesium nitrate, calcium triflate and any combinations thereof, preferably calcium nitrate.

It is further preferred that the at least one first epoxy curative is contained in an amount in the range of from 1 to 20 wt.-%, preferably in the range of from 2 to 15 wt.-%, more preferably in the range of from 5 to 10 wt.-% based on the total weight of part (A).

Preferably, the at least one second epoxy curative is selected form the group consisting of imidazoles, imidazole-salts, imidazolines or aromatic tertiary amines including those having the structure of formula (3):

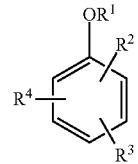

Formula (3)

wherein
$R^1$ is H or alkyl, such as, e.g., methyl or ethyl, preferably methyl;
$R^2$ is $CH_2NR^5R^6$;
$R^3$ and $R^4$ may be, independently from each other, present or absent and when present $R^3$ and $R^4$ are $CH_2NR^5R^6$;
$R^5$ and $R^6$ are, independent from each other, alkyl, preferably $CH_3$ or $CH_2CH_3$. Exemplary second epoxy curatives for use herein according to formula (3) include tris-2,4,6-(dimethylaminomethyl)phenol commercially available under the trade designation ANCAMINE K54 from Air Products and Chemicals Inc.

Preferably, the at least one second epoxy curative is contained in said curable adhesive precursor in an amount in the range of from 1 0 to 25 wt.-%, preferably in the range of from 5 to 20 wt.-%, more preferably in the range of from 10 to 15 wt.-%, based on the total weight of part (A).

The second part (B) of the sealant precursor according to the present disclosure comprises a blend of epoxy resins comprising at least one bisphenol A epoxy resin and at least one bisphenol F epoxy resin. It was found that using a blend of bisphenol A and bisphenol F epoxy resins was essential and gave rise to an unexpectedly good chemical resistance such as deicing fluids used in commercial airliner operation. Further, it was found that the tensile strength could be increased while maintaining good elongation. On the other hand, it was found that when only a bisphenol A-based epoxy resin was used, the resulting sealant obtained therefrom was much lower in tensile strength. It was further found that a certain level of bisphenol A-based resin was needed to obtain appropriate resistance against chemical influences such as hydraulic liquids commonly used in aerospace.

In general, epoxy resins are polymers having one or more epoxy-functionality. Typically but not exclusively, the polymers contain repeating units derived from monomers having an epoxy-functionality. The epoxy-functionalities allow the resin to undertake cross-linking reactions. The epoxy resins may have an average epoxy-functionality of at least 1, greater than one, or of at least 2. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol, or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups.

Preferred epoxy resins include epoxy resins containing or consisting of glycidyl ethers or polyglycidyl ethers of bisphenol A and bisphenol F. That is, they contain one or more repeating units derived from bisphenol A and F. Such ethers, or such repeating units are obtainable, for example, by a polymerization of glycidyl ethers of bisphenol A and F with epichlorohydrin. Epoxy resins of the type of diglycidyl ether of bisphenol A can be represented by formula (4) wherein n denotes the repeating unit (in case of n=0 formula (4) represents the diglycidyl ether of bisphenol A):

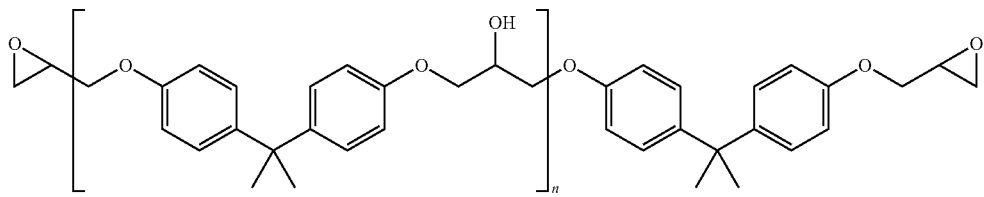

Instead of, or in addition to, using the aromatic epoxy resins described above also their fully or partially hydrogenated derivatives (i.e. the corresponding cycloaliphatic compounds) may be used In addition to using aromatic epoxy resins also aliphatic, for example acyclic, linear or branched, epoxy resins may be used. Of particular interest are cycloaliphatic epoxy resins.

Typically, the epoxy resin is liquid. The epoxy resins may include solid epoxy resins, used in dissolved form, or dispersed, for example in another liquid resin. Preferably, the epoxy resin is liquid at ambient conditions (23° C., 1 bar). The epoxy resins may contain halogens, preferably bromine atoms to make them less flammable.

Examples of suitable and commercially available epoxy resins include diglycidylether of bisphenol A (available under the trade designation EPON 828, EPON 830, EPON 1001 or EPIKOTE 828 from Hexion Speciality Chemicals GmbH, Rosbach, Germany, or under the trade designation D.E.R-331 or D.E.R-332 from Dow Chemical Co); diglycidyl ether of bisphenol F (e.g. EPICLON 830 available from Dainippon Ink and Chemicals, Inc. or D.E.R.-354 from Dow Chemical Co, Schwalbach/Ts., Germany); diglycidyl ethers of a blend of bisphenol A and bisphenol F (e.g. EPIKOTE 232 available from Momentive Speciality Chemicals, Columbus, USA). Other epoxy resins based on bisphenols are commercially available under the trade designations EPILOX (Leuna Epilox GmbH, Leuna, Germany); flame retardant epoxy resins are available under the trade designation D.E.R 580 (a brominated bisphenol type epoxy resin available from Dow Chemical Co.).

For example, the epoxy resin may be a blend of a bisphenol A resin based on bisphenol A and epichlorhydrin and a bisphenol F resin based on bisphenol F and epichlorhydrin having an epoxy equivalent weight in the range of from 200 to 400 g/mol, e.g. 210 to 220 g/mol or 310 to 390 g/mol.

With regard to the respective amounts, it is preferred that the blend of epoxy resins comprising at least one bisphenol A epoxy resin and at least one bisphenol F epoxy resin is contained in an amount in the range of from 5 to 40 wt.-%, preferably in the range of from 10 to 35 wt.-%, more preferably in the range of from 15 to 30 wt.-%, based on the total weight of part (B) of the curable adhesive precursor.

Part (B) of the sealant precursor as described herein comprises at least one silicone-based resin comprising epoxy functionalities. In combination with the other components of the sealant precursor as described herein this has the effect that the cured sealant obtained therefrom not only exhibits the flexibility and elasticity generally needed for sealants, but also the mechanical stability and resistance against chemical and aging influences. That is, the silicone-based resin comprising epoxy functionalities exhibits the characteristics of a silicone resin, but also comprises epoxy moieties which may be crosslinked by the epoxy curing agents as described herein. In particular, it is preferred that the silicone-based resin comprising epoxy functionalities comprises alkoxy-silicone moieties. Typically, the silicone-based resin comprising epoxy functionalities is a silicone-epoxy elastomer. Such silicone-based resin comprising epoxy functionalities may be obtained from at least one epoxy resin and at least one alkoxy-silicone resin. Typically, they may be obtained by reacting at least one epoxy resin with at least one alkoxy-silicone resin and preferably at least one hydroxyl-functional compound. Aliphatic epoxy resins are particularly preferred. Preferably, the silicone-based resin comprising epoxy functionalities is liquid at ambient temperatures and pressures. In this regard, it is preferred that the silicone-based resin comprising epoxy functionalities has a viscosity at 25° C. according to ASTM D445 in the range of from 500 to 2500 m Pa s, preferably in the range of from 800 to 2200 m Pa s, more preferably in the range of from 1000 to 2000 m Pa s, even more preferably in the range of from 1200 to 1800 m Pa s. Higher or lower viscosities were found not to be practicable for the scope of the present disclosure.

The silicone-based resin comprising epoxy functionalities generally comprises epoxy moieties which afford crosslinking abilities with the epoxy curing agents as described herein to both other silicone-based resin comprising epoxy functionalities molecules and the epoxy resins as described herein. Thus, after curing, a sealant is obtained exhibiting properties typical for sealants such as flexibility and elongation as well as the mechanical and chemical resistance of epoxy compounds. Accordingly, the sealant precursor and the curable sealant composition obtained therefrom is suited for applications where such a combination is particularly desirable. This applies in particular to applications in aerospace. With regard to the epoxy moieties present in the silicone-based resin comprising epoxy functionalities, it is preferred that the silicone-based resin comprising epoxy functionalities has an epoxy equivalent weight according to ASTM D1652 in the range of from 100 to 1500 g/eq, preferably in the range of from 200 to 1000 g/eq, more preferably in the range of from 300 to 700 g/eq. An example for a silicone-based resin comprising epoxy functionalities advantageously used in the scope of the present disclosure is Silikopon® EF (Evonik Industries).

It is preferred that the at least one silicone-based resin comprising epoxy functionalities is contained in part (B) of the sealant precursor according to the present disclosure in an amount of from 20 to 55 wt.-%, preferably from 25 to 50 wt.-%, more preferably from 30 to 45 wt.-%, based on the total weight of part (B) of the sealant precursor.

Part (B) of the sealant precursor according to the present disclosure preferably comprises a toughener. In this regard, it is preferred that the toughener is selected from core-shell polymers, rubbers, and silicone rubbers. Generally, and as common in the art, tougheners are used in the form of particles or powders. Preferably, the toughener particles as described herein are employed as dispersions in epoxy resins. Tougheners such as silicone rubbers, in particular non-functionalized silicone rubbers and core-shell polymers, which are dispersed in epoxy resin, preferably in either or both bisphenol A and bisphenol F epoxy resins, exhibit on one hand a good compatibility with the epoxy resins and the silicone-based resin comprising epoxy functionalities, but also give rise to a higher flexibility of the sealant obtained therefrom. An example for commercially available silicone rubbers dispersed in epoxy resins is Albidur 2240A (Evonik Industries). Core-shell polymer particles dispersed in epoxy resins are commercially available, for example, as Kane Ace MX257 (Kaneka).

Preferably, the toughener is contained in part (B) in an amount in the range of from 1 to 25 wt.-%, preferably in the range of from 5 to 20 wt.-%, more preferably in the range of from 10 to 15 wt.-%, based on the total weight of part (B) of the sealant precursor. These numbers and ranges pertain only to pure toughener material such as core-shell particles or silicone rubber particles, i.e. excluding the epoxy resin(s) in which the toughener is preferably dispersed. In the preferred case that the toughener is dispersed in at least one epoxy resin, preferably at least one bisphenol-based epoxy resin, it is preferred that the total content of bisphenol-based epoxy resin in part (B) is at least 30 wt.-%. This has the effect that the sealant obtained from the sealant precursor as described herein exhibits a certain resistance to Skydrol, i.e. a hydraulic liquid commonly used in aerospace applications.

It is further preferred that the sealant precursor further comprises a filler material. Generally, the filler material for use herein is not particularly limited. That is, the filler material may be organic and/or inorganic, which includes inorganic particles in an organic matrix and vice versa, or a mixture of inorganic and organic materials such as mixtures of particles, liquids, and mixtures of particles dispersed in liquids. Filler materials may have the effect of advantageously effecting the viscosity and thixotropy of the sealant precursor and the curable sealant composition obtained therefrom as described herein.

In particular, it is preferred that the filler material in part (B) comprises aluminium hydroxide, phosphate compounds or phosphate salts such as calcium phosphate, calcium oxide, calcium carbonate and/or silica particles, and any combinations thereof. Preferably, the silica particles comprise fumed silica, preferably hydrophobically fumed silica, fused silica, amorphous silica particles, hollow silica particles, silica gels, calcium silicates, and any combinations thereof. Preferably, part (B) comprises as filler material a combination of at least two, preferably of at least three different fillers as described herein. In this regard, it is preferred that part (B) contains as filler material combination of aluminium hydroxide, at least one phosphate compound, preferably a phosphate salt, and at least one silica compound. This combination may have the effect of yielding improved sealing properties and chemical resistance of the cured sealant composition, such as an improved elongation, constant tensile strength as well as an improved tensile strength after exposure to corrosive media such as Skydrol liquid. Preferably, the combination contains the aluminium hydroxide, the at least one phosphate compound and the at least one silica compound in equal parts per weight. Exemplary commercial fillers include SHIELDEX AC5 (a synthetic amorphous silica, calcium hydroxide mixture available from W.R. Grace in Columbia, Md., USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Düsseldorf, Germany); AEROSIL R-202 (a hydrophobically fumed silica available from Evonik Industries, Germany); MINSIL SF 20 (available from Minco Inc., 510 Midway, Tenn., USA); amorphous, fused silica; and APYRAL 24 ESF (epoxysilane-functionalized (2 wt.-%) aluminium trihydrate available from Nabaltec GmbH in Schwandorf, Germany). Fused silica is available, for example, under the trade designation MINSIL from Minco Inc., Midway, USA. Hollow glass microspheres are available under the trade designation MICROBUBBLES from 3M Company, St. Paul, Minn., USA. Phosphate compound such as orthophosphate compounds are available, for example, under the trade name Heucophos (e.g. Heucophos CMP) from Heucotech Ltd., Heubach (Germany).

It is preferred that the filler material in part (B) is contained in an amount in the range of from 0.1 to 20 wt.-%, preferably in the range of from 1 to 17 wt.-%, more preferably in the range of from 3 to 15 wt.-% based on the total weight of part (B) of the curable sealant precursor.

Preferably, the sealant precursor according to the present disclosure comprises
  (a) a first part (A) comprising:
    (i) in the range of from 50 to 97 wt.-%, preferably in the range of from 55 to 95 wt.-%, more preferably in the range of from 60 to 92.5 wt.-%, based on the total weight of part (A) of an epoxy curing agent having an amine equivalent weight of at least 150 grams per mole of amine equivalents;
    (ii) in the range of from 1 to 20 wt.-%, preferably in the range of from 2 to 15 wt.-%, more preferably in the range of from 5 to 10 wt.-% based on the total weight of part (A) of a first curative; and (iii) optionally, in the range of from 0 to 25 wt.-%, preferably in the range of from 5 to 20 wt.-%, more preferably in the range of from 10 to 15 wt.-%, based on the total weight of part (A), of at least one second epoxy curative distinct from the first curative; and
(b) a second part (B) comprising:
  (i) in the range of from 5 to 40 wt.-%, preferably in the range of from 10 to 35 wt.-%, more preferably in the range of from 15 to 30 wt.-% based on the total weight of part (B), of a blend of epoxy resins comprising at least one bisphenol A epoxy resin and at least one bisphenol F epoxy resin; and
  (ii) in the range of from 20 to 55 wt.-%, preferably in the range of from 25 to 50, more preferably in the range of from 30 to 45 wt.-%, based on the total weight of part (B) of at least one silicone-based resin comprising epoxy functionalities; and
  (iii) in the range of from 1 to 25 wt.-%, preferably in the range of from 5 to 20 wt.-%, more preferably in the range of from 10 to 15 wt.-%, based on the total weight of part (B) of a toughening agent;
  (iv) optionally, in the range of from 0.1 to 20 wt.-%, preferably in the range of from 1 to 17 wt.-%, more preferably in the range of from 3 to 15 wt.-% based on the total weight of part (B) of a filler material.

The ratio between part (A) and part (B) of the curable sealant precursor according to the present disclosure is comprised in the range of from 10:1 to 1:10, preferably from 5:1 to 1:5 and more preferably from 2:1 to 1:2, even more preferably about 1 to about 1.

The sealant precursor according to the present disclosure may easily be stored, shipped, and applied as desired by the user via an application kit, comprising part (A) and part (B) of said sealant precursor in separate containers. Thus, the present disclosure further provides an application kit, comprising (a) part (A) of the sealant precursor according to the present disclosure contained in a first container, (b) part (B) of the sealant precursor according to the present disclosure contained in a second container, (c) a first portion where at least portions of part (A) and part (B) of said sealant precursor can be mixed, and a second portion by which the curable sealant composition (i.e. combined parts (A) and (B)) are applied onto a surface of a substrate.

"Applying" as used herein has the common meaning as used in the art. "Applying" may comprise application of the curable sealant composition by applying by means of nozzle, by extrusion or by simply coating onto a surface, such as by knife coating. "Applying" also comprises application onto at least one surface, such as the surface of a part or part of a device, as well as application at least partially into or onto a gap in a part or between a plurality of parts. Accordingly, effective sealing of gaps in a part or between parts may be provided. Similarly, sealing of a surface against outer influences may also be provided. "Parts" include parts such as panels, cases, tanks, screws, fasteners, bolts and the like, and any combination thereof. In particular, outer or interior parts of vehicles, in particular aircraft, are included herein since the precursors and sealant compositions according to the present disclosure are suited for sealant gaps and surfaces even under demanding conditions common to aerospace industries.

Therefore, a further object of the present disclosure is a curable sealant composition, obtained from combining part (A) and part (B) of the sealant precursor as described herein.

This curable composition may be applied onto surfaces of substrates and be allowed to cure under ambient conditions. Curing may be observed as well-known in the art, in particular with regard to the tack-free time. The curable sealant composition may either be used as coating to seal the surface thereunder, or may be placed between two or more different parts in order to provide a seal of remaining gaps. Curing times at ambient conditions may be as low as less than 10 h, less than 8 h, or even less than 6 h, dependent on the composition of the sealant precursor and the corresponding curable sealant composition and the thickness of the coating.

Accordingly, the present disclosure further provides a sealant, obtained from curing the curable sealant composition as described herein.

Preferably, the sealant exhibits a tensile strength at 23° C. and 50% relative humidity according to ISO 37 of at least 4 MPa, preferably at least 5 MPa, more preferably at least 6 MPa. It is further preferred that the sealant exhibits a tensile elongation at 23° C. and 50% relative humidity according to ISO 37 of at least 150%, preferably of at least 170%, more preferably of at least 200%. Additionally, it is preferred that the sealant according to any one of claims 14 to 16, wherein the sealant exhibits a peel strength according to AITM 2-0013_2000-11_2 of at least 40 N/25 mm, preferably of at least 50 N/25 mm, more preferably of at least 60 N/25 mm, even more preferably of at least 70 N/25 mm. These properties are advantageous for sealants used in aerospace. Similarly, the sealants should keep their properties to a certain extent after being exposed to water, higher temperatures, fluids such as deicing fluids, fuels, and/or hydraulic fluids used in aerospace. This may be achieved by the sealants as described herein. In particular, it is preferred that the sealant exhibits a tensile strength according to ISO 37 after being stored for 1000 h in water at a temperature of 35° C. of at least 1 MPa, preferably of least 1.2 MPa, more preferably of at least 1.4 MPa. Similarly, it is preferred that the sealant exhibits a tensile elongation according to ISO 37 after being stored for 1000 h in water at a temperature of 35° C. of at least 100%, preferably of at least 125%, more preferably of at least 140%. Furthermore, the sealants as described herein exhibit preferably an overlap shear strength according to EN 2243-1 (issue 04-2007) of at least 5 MPa, preferably of at least 8 MPa, and more preferably of at least 10 MPa. Sealants exhibiting at least one of these properties, or preferably a combination of these properties, are excellently suited for applications in aerospace or general vehicle manufacture.

Accordingly, the present disclosure further provides a part of a vehicle comprising at least one sealant as described herein. Preferably, the part of the vehicle is a part of an aircraft having at least temporary contact with at least one substance selected from deicing fluid, fuel such as avgas or jet fuel, fire-resistant aviation hydraulic fluid, such as Skydrol, water or sodium chloride solution. In this regard, it is preferred that the parts in direct contact with the at least one sealant are made of materials selected from at least one metal, at least one polymeric material and at least one composite material, glass, and composites made therefrom. Preferably, the metal is selected from steel, aluminium, magnesium and titanium and alloys therefrom, the polymeric material is selected from polyurethane, polyimide, polycarbonate, fluorinated polymers such as PTFE and the composite material is a fiber-enforced resin such as a phenolic or epoxy resin. With regard to the vehicle, it is preferably selected from aircraft, helicopter, spacecraft, truck, car, and train. In a preferred embodiment of the present disclosure, the vehicle is an aircraft and the part is a part of a wing, an exterior part of the body or an interior part of the body.

Further provided by the present disclosure is a use of the sealant precursor or of the sealant as described herein for sealing parts in a vehicle, preferably wherein the vehicle is selected from aircraft, helicopter, spacecraft, truck, car, and train. Due to the advantages properties of the sealants as described herein and their resulting suitability for applications in aerospace, it is preferred for the use as described herein that the vehicle is an aircraft or a helicopter. It is further preferred that the sealant is in permanent contact with at least one part consisting of metal, polymeric material, glass, or composite material, or any combinations thereof. In particular, use as described herein comprises at least temporary contact with at least one substance selected from deicing fluid, fuel such as avgas or jet fuel, fire-resistant aviation hydraulic fluid, such as Skydrol, water or sodium chloride solution.

Examples

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Examples

Materials used:
AEROSIL R202 (Evonik Industries): hydrophobic fumed silica
ANCAMINE K54 (Air Products and Chemicals): Tris-2,4,6-dimethyl amino methylphenol. Calcium nitrate tetrahydrate (VWR International GmbH): $Ca(NO_3)_2 \cdot 4H_2O$
ARALDITE PY 322 (Huntsman) modified Bisphenol A resin (EEW 310-390 g/eq; viscosity 0.7-1.4 Pas)
EPON 828 (Hexion Specialty Chemicals GmbH): difunctional bisphenol A/epichlorohydrin derived liquid epoxy resin (EEW 185-192 g/eq; viscosity 110-150 Pas)
EPON 232 (Hexion Speciality Chemicals GmbH): bisphenol F/epichlorhydrin derived liquid epoxy resin
Silikopon EF: Silicone-epoxy elastomer (Evonik Industries)
EPONEX 1510 (Hexion Specialty Chemicals GmbH): cycloaliphatic epoxy resin (EEW 210-220 g/eq; viscosity 18-2.5 Pas)
HYCAR ATBN 1300X21 (Emerald Materials): Butadiene-acrylonitrile copolymer
KANE ACE MX257 (Kaneka): core-shell polymer (37%) dispersed in epoxy resin (diglycidylether of bisphenol A)
Albidur 22 40A (Evonik Industries): 40% dispersion of silicone rubber in bisphenol A diglycidylether resin
TTD (BASF): trioxatridecane diamine
Dynasilan Glyeo (Evonik): epoxysilane
Heucophos CMP (Heubach): Orthophosphate
Spacerite SC11: Aluminium trihydroxide
Shieldex AC5 (W.R. Grace): Amorphous Silica mixture
PAA: Aliphatic Polyamidoamine, prepared according to EP2495271A1, example CA-1
EPIKOTE 232: (Hexion Specialty Chemicals GmbH) a blend of bisphenol A and bisphenol
F resin, EEW: 174-179 g/eq, viscosity 4.5-6.0 Pas)
Test Methods
1. Cohesive Strength (Overlap Shear Strength (OLS))
Overlap shear strength was determined according to European Standard EN 2243-1 (issue 04-2007).

Lap shear specimens were made using 2024-T3 etched aluminum panels. The curable sealant was applied to one edge of each of the two panels (i.e., adherents) using a scraper. Bond area was 12.5 mm×25 mm per sample. Spacers were used to control the thickness of the sealant layer. Glass beads (125-150 µm in diameter) within the sealant served as spacers. The bond was closed and the samples were cured for 4h at room temperature (23+/−2° C.) under the press (110 kPa) followed by 2h @ 65° C.

The bonds were tested to failure at room temperature (23+/−2° C.) or at elevated temperature (85+/−2° C.) using a crosshead displacement rate of 10 mm/min. The failure load was recorded, and the lap width was measured with a vernier caliper. The quoted lap shear strengths were calculated as failure load/(measured width of the bond x measured length of the bond). The average and standard deviation were calculated from the results. The overlap shear strength (OLS) values are recorded in Mega Pascal (MPa) and are an average of the results obtained with 3 samples.

2. Peel Strength
Peel strength was determined according to AITM 2-0013_2000-11_2. Aluminum panels 2024-T3 etched and primed with BR 127 with the geometry 35×150×1.6 mm were used with a metal mesh with geometry of 35×300 with conformity to ISO 4783/1
W (mesh aperture)=0.315 to 0.63 mm
D (wire diameter)=0.180 to 0.315 mm
$A_0$ (void percentage: $A_0=[W/(W+d)^2]\times 100$)=40 to 50%
3 mm of the curable sealant material was applied on the aluminum panel, the mesh was coated with the material and layed on the 3 mm thick coat. One additional layer of 1 mm of the material was applied on the top. The samples are cured in an accelerated cure cycle of 3 hours at 60° C. and 6.5 days at room temperature. Peel strength was determined by measurement on a Zwick Z100 machine with speed of 50 mm/min.

3. Soaking
The soaking in liquids was determined by measuring the weight before immersion and after from at least 3 specimens type 2 ISO 37. The percentual change was calculated.

4. Tensile Properties ISO 37: Rubber, Vulcanized or Thermoplastic
Determination of Tensile Stress-Strain Properties
The specimen's type 2 were made according to ISO 37 (2005-12) and cured in an accelerated cure cycle of 3 hours at 60° C. and 6.5 days at room temperature. The measurement was done with speed of 500 mm/min at room temperature in standard climate (23° C.±2° C. and 50±10% relative humidity). All specimens were conditioned at least 2 hours to standard climate. The tensile strength, elongation at break and tensile modulus are determined with the ISO 37 with a Zwick Z 100. At least results from three specimens were averaged.

Preparation of Part a and Part B
Parts A (A1 to A5) of the sealant precursor compositions were prepared by combining the ingredients as listed in table 1 using a high speed mixer (DAC 150 FVZ Speedmixer, from Hauschild Engineering) with stirring at 3000 rpm. In a first step the liquid components for part A were mixed together for 2 min. Solid parts were added one after the other with mixing for 1 minute at 3000 rpm after each addition. The complete mixtures were again stirred for at least 2 min at 3000 rpm in the high speed mixer to ensure complete dispersion of all ingredients.

Parts B (B1 to B5) of the sealant precursor composition were prepared according to the same procedure as outlined for Parts A, but using the ingredients as listed in table 2.

Preparation of Curable Sealant Precursors Comprising Part a and Part B

After all raw materials were added the mixtures were (optionally) degassed and then filled into a corresponding unit of a 200 ml dual pack cartridge obtained from Sulzer Mixpac, AG, Rotkreuz, Switzerland, (i.e. one unit for part (A), the other unit for part (B)). A mixing nozzle, type "F 10-18" (for 200 ml), was fitted to the cartridge. After a dwell time of 12-24 hours, the curable sealant composition was extruded from the cartridge by using a pneumatic dispensing gun at a pressure of 4 bar (400 kPa). Ratios of part (A) and part (B) were generally about 1 to about 1. Curing of the curable sealant composition was done as specified in the test methods above.

TABLE 1

Composition of part (A), ratios in wt.-%

| Raw material | A1 | A2 | A3 | A4 | A5 |
|---|---|---|---|---|---|
| Aliphatic polyamidoamine (AEW 250 g/eq) | 80 | 90.9 | 59 | 87 | 88.9 |
| TTD | | | | | |
| Ankamin K 54 | 12 | | | 13 | |
| Calcium Nitrate | 8 | 9.1 | 10 | | 8.9 |
| Aerosil R 202 | | | | | |
| Hypro 1300x16 | | | 18 | | |
| ATBN | | | | | |
| AMEO | | | 13 | | |
| White pigment | | | | | 2.2 |

TABLE 2

Composition of part (B), ratios in wt.-%

| Raw material | B1 | B2 | B3 | B4 | B5 | B6 |
|---|---|---|---|---|---|---|
| Epon 232 | 13 | 18 | | 13 | 20.6 | 15.2 |
| Epon 828 | 13 | 18 | 13 | 13 | 20.6 | 12.4 |
| Silikopon EF | 37 | | 42.5 | 37 | | 40 |
| GLYMO | | 7.5 | | | | |
| Albidur 2240A | 33 | | 37.9 | | 52.4 | |
| Kane Ace MX 257 | | | | 33 | | 19 |
| Aerosil R202 | 4 | | 4.6 | 4 | 6.4 | 3.8 |
| Epodil 757 | | 7.5 | | | | |
| Calcium Nitrate | | | | | | |
| Hypro 1300 x 44 | | 34 | | | | |
| Tactix 742 | | 15 | | | | |
| Heucophos CMP | | | | | | 3.2 |
| Aluminium Trihydroxide | | | | | | 3.2 |
| Shieldex AC5 | | | | | | 3.2 |

TABLE 3

Composition of examples

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| part (A) | A1 | A2 | A1 | A5 | A3 | A1 | A1 | A4 |
| part (B) | B1 | B1 | B4 | B6 | B2 | B3 | B5 | B1 |

TABLE 4

Properties of cured samples obtained from Ex. 1

| Ageing condition | Tensile strength [MPa] | Elongation [%] | Soaking [%] | Peel strength [N/25 mm] | Single Lap Shear 12.5 × 25 mm² [MPa] |
|---|---|---|---|---|---|
| untreated | 9.62 | 210 | | 81 | 11.7 |
| 168 hours 3% NaCl solution 60° C. | 1.86 | 152 | 31.2 | | |
| 168 hours Skydrol 23° C. | 2.36 | 98 | 41.2 | | |
| 1000 hours water 40° C. | 1.51 | 146 | | | |
| 168 hours Deicing Liquid 23° C. | 2.77 | 163130 | 10.6 | | |
| 168 hours Jet Fuel 60° C. | 5.32 | 178 | | | |
| Ageing at 80° C. 3.5 weeks | 16.2 | 70 | | | |
| 2000 hours | 20.74 | 32 | | | |

The composition obtained from Ex. 1 exhibits a desirable combination of properties, even under demanding ageing conditions.

TABLE 5

Properties of cured samples obtained from Ex. 2

| Ageing condition 168 hours | Tensile strength [MPa] | Elongation [%] | Soaking [%] |
|---|---|---|---|
| untreated | 8.16 | 228 | |
| 3% NaCl solution 60° C. | 1.64 | 80 | 28 |
| Deicing Liquid 23° C. | 2.23 | 112 | 6 |
| Skydrol 23° C. | 2.17 | 114 | 29 |

The composition obtained from Ex. 2 exhibits a desirable combination of properties, even under demanding ageing conditions.

TABLE 6

Properties of cured samples obtained from Ex. 3

| Ageing condition 168 hours | Tensile strength [MPa] | Elongation [%] | Soaking [%] | Peel strength [N/25 mm] | Single Lap Shear 12.5 × 25 mm² [MPa] |
|---|---|---|---|---|---|
| untreated | 9.61 | 190 | | 120 | 14.3 |
| 3% NaCl solution 60° C. | 2.62 | 138 | 31 | | |
| Deicing Liquid 23° C. | 3.3 | 121 | 9.1 | | |
| Skydrol 23° C. | 3.13 | 110 | 35.7 | | |

The composition obtained from Ex. 3 exhibits a desirable combination of properties, even under demanding ageing conditions.

TABLE 7

Properties of cured samples obtained from Comp. Ex. 1

| Ageing condition | Tensile strength [MPa] | Elongation [%] |
|---|---|---|
| untreated | 2.19 | 157 |
| 168 hours 3% NaCl solution 60° C. | 5.78 | 42 |
| 168 hours Deicing Liquid 23° C. | 5.63 | 74 |
| 2000 hours 80° C. | 17.4 | 24 |

Hycar elastomers instead of the silicone-based resins having epoxy functionalities lead to a high decrease of elongation after being subjected to ageing conditions.

TABLE 8

Properties of cured samples obtained from Comp. Ex. 2

| Ageing condition 168 hours | Tensile strength [MPa] | Elongation [%] | Soaking [%] |
|---|---|---|---|
| untreated | 5.31 | 314 | |
| 3% NaCl solution 60° C. | 1.46 | 174 | 29.1 |
| Deicing Liquid 23° C. | 1.31 | 149 | 12.3 |
| Skydrol 23° C. | 0.49 | 86 | 77.4 |

Without bisphenol F epoxy resin, there is a significant drop in the tensile strength and chemical resistance, in particular vs. Skydrol.

TABLE 9

Properties of cured samples obtained from Comp. Ex. 3

| Ageing condition 168 hours | Tensile strength [MPa] | Elongation [%] | Soaking [%] | Peel strength [N/25 mm] | Single Lap Shear 12.5 × 25 mm² [MPa] |
|---|---|---|---|---|---|
| untreated | 21.2 | 39 | | 147 | 16.4 |
| 3% NaCl solution 60° C. | 2.7 | 112 | 15.8 | | |
| Deicing Liquid 23° C. | 14 | 10.2 | 6.5 | | |
| Skydrol 23° C. | 19.9 | 28 | 6.3 | | |

A composition not comprising the silicone-based resin comprising epoxy functionalities yields a stiff material with only a very low elongation.

TABLE 10

Properties of cured samples obtained from Comp. Ex. 4

| Ageing condition | Tensile strength [MPa] | Elongation [%] | Soaking [%] | Peel strength [N/25 mm] |
|---|---|---|---|---|
| untreated | 3.97 | 237 | | 113 |
| 3% NaCl solution 60° C. | 2.8 | 205 | 4.3 | |
| Deicing Liquid 23° C. | 1.08 | 101 | 11.1 | |
| Skydrol 23° C. | 0.52 | 63 | 64 | |

A formulation lacking the first epoxy curative, in particular a metal salt, yields significant lower tensile strength and low chemical resistance, in particular in Skydrol.

TABLE 11

Properties of cures samples obtained from Ex. 4

| Ageing condition | Tensile strength [MPa] | Elongation [%] | Soaking [%] | Shore A |
|---|---|---|---|---|
| untreated | 10.7 | 209 | | 75 |
| 3% NaCl solution 60° C. | 3.63 | 150 | | 67 |
| Deicing Liquid 23° C. | 3.35 | 104 | 5.5 | 70 |
| Skydrol 23° C. | 4.3 | 138 | 15 | 68 |

Inclusion of a combination of three filler materials yielded improved properties.

The invention claimed is:

1. A sealant precursor, comprising
a first part (A) comprising
   (a1) an epoxy curing agent having an amine equivalent weight of at least 150 grams per mole of amine equivalents in an amount of from 50 to 97 wt.-%, based on the total weight of the first part (A); and
   (b1) a first epoxy curative in an amount of from 1 to 20 wt.-%, based on the total weight of the first part (A); and
a second part (B) physically separated from the first part (A) and comprising
   (a2) a blend of epoxy resins comprising at least one bisphenol A epoxy resins and at least one bisphenol F epoxy resin in an amount of from 5 to 40 wt.-%, based on the total weight of the second part (B); and
   (b2) at least one silicone-based resin comprising epoxy functionalities in an amount of from 20 to 55 wt.-%, based on the total weight of the second part (B).

2. The sealant precursor according to claim 1, wherein the epoxy curing agent is a polyether amido-amine.

3. The sealant precursor according to claim 1, wherein part (A) further comprises (c1) at least one second epoxy curative distinct from the at least one first epoxy curative.

4. The sealant precursor according to claim 3, wherein the at least one second epoxy curative is selected from the group consisting of imidazoles, imidazole-salts, imidazolines or aromatic tertiary amines.

5. The sealant precursor according to claim 1, wherein the at least one first epoxy curative is a metal salt.

6. The sealant precursor according to claim 5, wherein the anion in the metal salt is selected from halides, sulphates, sulfonates, phosphates, nitrates, and carbonates.

7. The sealant precursor according to claim 1, wherein the silicone-based resin comprising epoxy functionalities further comprises alkoxy-silicone moieties.

8. The sealant precursor according to claim 1, wherein the silicone-based resin comprising epoxy functionalities has a viscosity at 25° C. according to ASTM D445 in the range of from 500 to 2500 m Pa s.

9. The sealant precursor according to claim 1, wherein the silicone-based resin comprising epoxy functionalities has an epoxy equivalent weight according to ASTM D1652 in the range of from 100 to 1500 g/eq.

10. The sealant precursor according to claim 1, wherein the silicone-based resin comprising epoxy functionalities is obtained from at least one alkoxy-silicone resin.

11. A curable sealant composition, obtained from combining part (A) and part (B) of the sealant precursor according to claim 1.

12. A sealant, obtained from the curable sealant composition according to claim 11.

13. A method of using the sealant according to claim 12 as for sealing parts in a vehicle.

14. The method according to claim 13, wherein the sealant is in permanent contact with at least one part consisting of metal, polymeric material, glass, or composite material, or any combinations thereof.

* * * * *

UNITED STATES PATENT AND TRADEMARK OFFICE
CERTIFICATE OF CORRECTION

PATENT NO. : 10,669,460 B2
APPLICATION NO. : 16/489404
DATED : June 2, 2020
INVENTOR(S) : Mareike Bardts Page 1 of 1

It is certified that error appears in the above-identified patent and that said Letters Patent is hereby corrected as shown below:

In the Specification

Column 2
Line 31, delete "the second part (B) comprising" and insert the same on Column 2, Line 32 as a new line.

Column 3
Line 36, delete "the second part (B) comprising" and insert the same on Column 3, Line 37 as a new line.

Column 7
Line 67, delete "Co);" and insert -- Co.); --, therefor.

Column 13
Line 47, delete "18-2.5" and insert -- 1.8-2.5 --, therefor.

Column 14
Line 54, delete "a" and insert -- A --, therefor.

Column 15
Line 2, delete "a" and insert -- A --, therefor.

Signed and Sealed this
Seventh Day of July, 2020

Andrei Iancu
*Director of the United States Patent and Trademark Office*